3,056,762
PHENOLIC RESINS

Alfred M. Tringali, Bayside, N.Y., assignor to Interchemical Corporation, New York, N.Y., a corporation of Ohio
No Drawing. Filed Aug. 25, 1959, Ser. No. 835,836
4 Claims. (Cl. 260—52)

This invention relates to improvements in synthetic resins and aims to provide new resins having particular utility in protective and decorative coatings, especially as inside can coatings for food and beverage cans.

For many years certain foods, as e.g. fish foods have been packed in metal cans that have inside coatings comprised of cured phenolic resins. Phenolic resins are fast curing and the cured films have several outstanding properties that make them useful as can linings. These properties include resistance to sulfide staining by food products, resistance to softening in the presence of oils and fatty acids, resistance to essential oil, resistance to blushing on processing in steam or water, insolubility in solvents, and hardness.

However, cured films of phenolic resins have been found deficient in other properties which are desirable in inside can coatings. One such property is flexibility. The phenolic resins in cured films are as a class brittle. They must be applied at low film weights because of this brittleness. This results in poor continuity at drawn and otherwise formed areas. With any thin film scratching is also a problem. A second property in which phenolic resins are deficient is adhesion to metal surfaces. Phenolics are sensitive to oily, oxidized or otherwise contaminated tin plate. Finally, most phenolic resins tend to give a characteristic flavor to food products, particularly those which contain appreciable amounts of free water. Carbohydrate containing products also pick up phenolic flavors.

We have now developed new resins, which when used as inside can coatings for food and beverage cans, maintain the good properties of the phenolic resins while overcoming to a large extent the above mentioned deficiencies. The new resins are made by reacting certain polymeric polyhydric phenols with formaldehyde in the presence of basic catalyst.

The polymeric polyhydric phenols that are used in making the new resins are polymeric polyether derivatives of dihydric phenols, especially bisphenol. The polymeric phenols can be further characterized as having a plurality of alternating aromatic nuclei and aliphatic chains united through ether oxygen, the aromatic nuclei being the hydrocarbon nucleus of the dihydric phenol and being free from functional groups. Advantageously the polymeric polyhydric phenol starting material is obtained by reacting an ethoxyline resin (Epons, Araldite, and Epi-Rez resins are typical commercial resins) with a dihydric phenol such as bisphenol in such ratios that there are two phenolic hydroxyl groups for each epoxide group of the ethoxyline resins. This produces a polymeric polyhydric phenol containing a phenolic hydroxyl for each epoxide group of resins used. Certain catalysts which catalyze the opening of the oxirane or epoxide ring will promote the desired reaction and minimize the possibility of gelation of the reaction mixture by undesirable side reactions. Particularly effective catalysts are tertiary amines and 0.5% of N,N-dimethylaniline is especially preferred.

Ethoxyline resins, also called epoxy or epoxide resins, are conventionally prepared by reacting a polyhydric phenol, especially bisphenol, with epichlorohydrin in the presence of alkali, the ratio of epichlorohydrin to bisphenol being adjusted to the desired molecular weight of resinous product which can be represented generally as

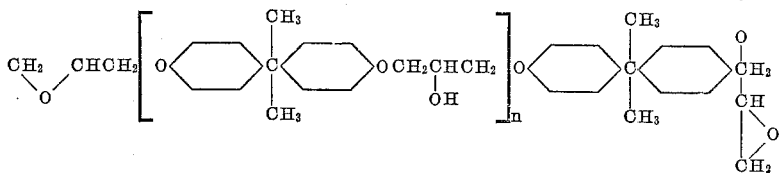

where $n$ is a small whole number. The polymeric polyhydric phenols that are used in the present invention can be made starting with bisphenol and epichlorohydrin provided the bisphenol is used in excess, i.e. in such ratios that the polymeric chain will terminate in a phenolic group rather than the epoxide group. Such polymeric polyhydric phenols can be represented generally by the formula,

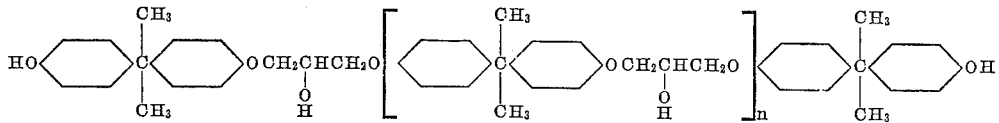

where $n$ is a small whole number. This method of obtaining the polymeric polyhydric phenol will also be illustrated in the examples.

Although 4,4-dihydroxydiphenyl dimethyl methane has been used in the above description it is to be understood that the invention is not limited to the use of this particular monomeric polyhydric phenol. Other monomeric polyhydric phenols can, of course, be used. In fact, we especially prefer to use "Bisphenol A" which is a commercial product consisting predominantly of the 4,4'-isomer mixed with minor amounts of the 2,2'-isomer and the 4,2-isomer.

Reaction between the polymeric polyhydric phenol and formaldehyde, preferably as paraformaldehyde, is carried out by refluxing in volatile organic solvent in the presence of basic catalyst at temperatures on the order of 90 to 150° C. for 1 to 10 hours. The ratio of formaldehyde to polymeric polyhydric phenol is about 2 moles of formaldehyde for each phenolic hydroxyl in the polymeric polyhydric phenol. However, it is preferable to use an excess of formaldehyde as such excess assures the presence of a sufficient amount of formaldehyde without otherwise affecting the reaction. Ammonia is the preferred catalyst.

The following examples in which the parts are by weight will further illustrate the invention.

*Example 1 (RL 7591).*—A polymeric polyhydric phenol is prepared by reacting 244 parts of Epon 834 (an epoxide resin made from Bisphenol A and epichlorohydrin, having an average mol. wt. of about 450 and an epoxide equivalent weight of 225–290), with 216 parts of Bisphenol A by refluxing at 300° F. for six hours in 114 parts xylol and using 2.3 parts of N,N-dimethylaniline as catalyst. The polymeric polyhydric phenol thus formed is cooled to 230° F. and then diluted with 77 parts of n-butanol and then reacted with 63 parts of formaldehyde (paraform) and 15 parts of 28% aqueous ammonia by refluxing at about 200° F. for six hours. Then water is azeotropically distilled for three to four hours during which time the temperature rises. The reaction mixture is then cooled to about 240° F., and 77 parts of n-butanol and 193 parts of xylol are added to give a solution of the phenol formaldehyde condensate having a viscosity of $Z-Z_2$ (Gardner-Holdt) and a total solids content of 52%.

To a portion of the resulting resin solution is added 1% of $H_3PO_4$ on solids basis and then the solution is reduced to roller coating viscosity (e.g. 34 to 40 sec. on a #4 Ford cup at 77° F.) with a solvent mixture consisting 2:1:1 xylol:butanol:isophorone. The solution is roller coated on 0.25 pound grade of electrolytic tin plate to give a dry film weight of 3.5 to 4.0 milligrams per square inch (calculated). After curing by baking at 420° F. for 12 minutes the films have good fabrication and steam processing resistance, good resistance to staining by tuna fish and good alkali pasteurization resistance. A similar roller coating finish without the $H_3PO_4$ catalyst has good fabrication and steam processing resistance.

Steam processing resistance is determined by contacting the coating with steam at 250° F. Films prepared in the above example withstood 60 minutes contact without

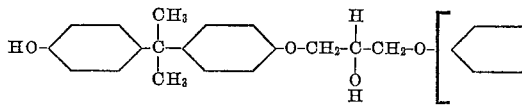

showing any appreciable discontinuity of film or film blush.

Alkaline pasteurization is determined by exposure to an aqueous solution of potassium hydroxide (300 p.p.m. KOH) at 160° F. Films prepared in accordance with the above example withstood 30 minutes exposure with-

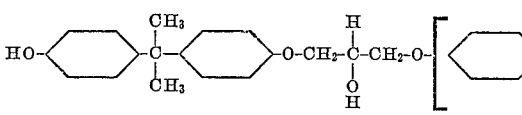

out showing any appreciable discontinuity of the film or film blush.

By good fabrication resistance it is meant that the flat sheets of tin plate coated with the cured film can be fabricated into can ends without seriously disrupting the film.

Can ends fabricated from the coated tin plate and having the coating inside the can were very resistant to

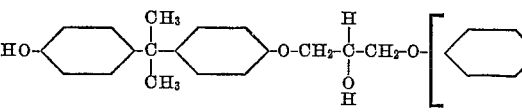

staining by tuna fish that had been processed in the can at 250° F. for 90 minutes.

The above tests indicate that the cured films of the novel resins of this invention are very desirable coatings for the insides of metal food containers.

*Example 2 (RL 7592).*—301 parts of Bisphenol A was reacted with 98 parts of epichlorohydrin and 40 parts of 97% sodium hydroxide in aqueous solution in 301 parts of water by refluxing at 100° C. for one hour and then 80 parts of xylol was added. After cooling the reaction mixture to 90° C., 13 parts of 37% aqueous HCl was added and the mixture was stirred at 90° C., for one hour. After allowing the reaction mixture to settle for five minutes the lower brine layer was separated and the remaining water was removed by azeotropic distillation. The resin solution is then cooled, diluted with 80 parts n-butanol and filtered to remove residual salt. This resin, which a polyhydric polymeric phenol having a molecular weight of approximately 1200 to 1500 is reacted with Paraform to give a phenol-formaldehyde resin as follows: 563 parts of the resin, 64 parts of Paraform and 22.3 parts of 28% aqueous ammonia are refluxed at 92° C. for two hours, then 94 parts xylene and 47 parts n-butanol are added and refluxing is continued for four hours. After adding another 94 parts xylene and another 37 parts n-butanol, water is azeotropically distilled from the mixture and, finally, the remaining resin solution is diluted with 74 parts of 2:1 mixture of xylene-butanol. The resulting resin solution has a solids content of 43 to 44% and a viscosity of 6.3 to 7.5 poises.

The resin was tested as an inside coating for metal food containers. In general, the results indicated this resin has very desirable properties for use as an inside coating for metal food containers although not as good as the resin of Example 1.

While there have been described what are considered to be the preferred embodiments of this invention, it will be understood that the practice of this invention is not limited to the resins and coatings described in the specific examples but that various modifications may be made therein without departing from the scope of the invention as it is defined in the appended claims.

I claim:

1. New phenolic resins comprising the reaction product of formaldehyde with a polyhydric phenol having the formula

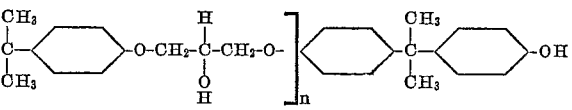

where $n$ is a number from 0 to 2, said reaction being carried out at 90–150° C. with at least two moles of formaldehyde for each phenolic hydroxyl in the polyhydric phenol.

2. New phenolic resins comprising the ammonia catalyzed condensation products of formaldehyde with a polyhydric phenol having the formula

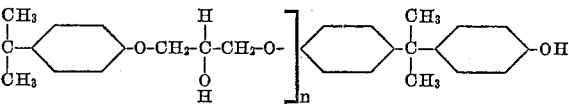

where $n$ is a number from 0 to 2, said reaction being carried out at 90–150° C. with at least two moles of formaldehyde for each phenolic hydroxyl in the polyhydric phenol.

3. New organic solvent soluble thermosetting phenolic resins comprising the ammonia catalyzed condensation products of formaldehyde with a phenyl having the formula

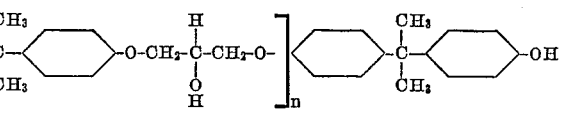

where $n$ is a number from 0 to 2, said reaction being carried out at 90–150° C. with at least two moles of formaldehyde for each phenolic hydroxyl in the polyhydric phenol.

4. A composition useful as a protective coating for the inside of metal food and beverage cans comprising a volatile organic solvent solution of a thermosetting phenolic resin which is the ammonia catalyzed condensation product of formaldehyde with a polyhydric phenol having the formula

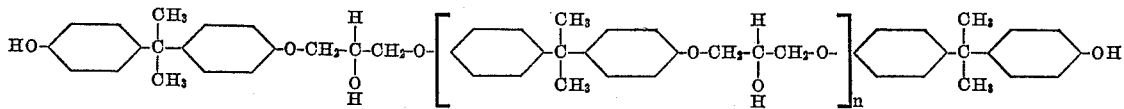

where $n$ is a number from 0 to 2, said condensation product being formed at 90–150° C. using at least two moles of formaldehyde for each phenolic hydroxyl in the polyhydric phenol.

References Cited in the file of this patent

UNITED STATES PATENTS 2,844,553    Taylor et al. _____ Apr. 24, 1953

FOREIGN PATENTS 202,102    Australia _____ June 6, 1956